Feb. 14, 1950   J. R. SMITH   2,497,327
MECHANISM FOR IMPARTING IMPULSES TO PENDULUMS
Filed Dec. 19, 1945   2 Sheets-Sheet 1
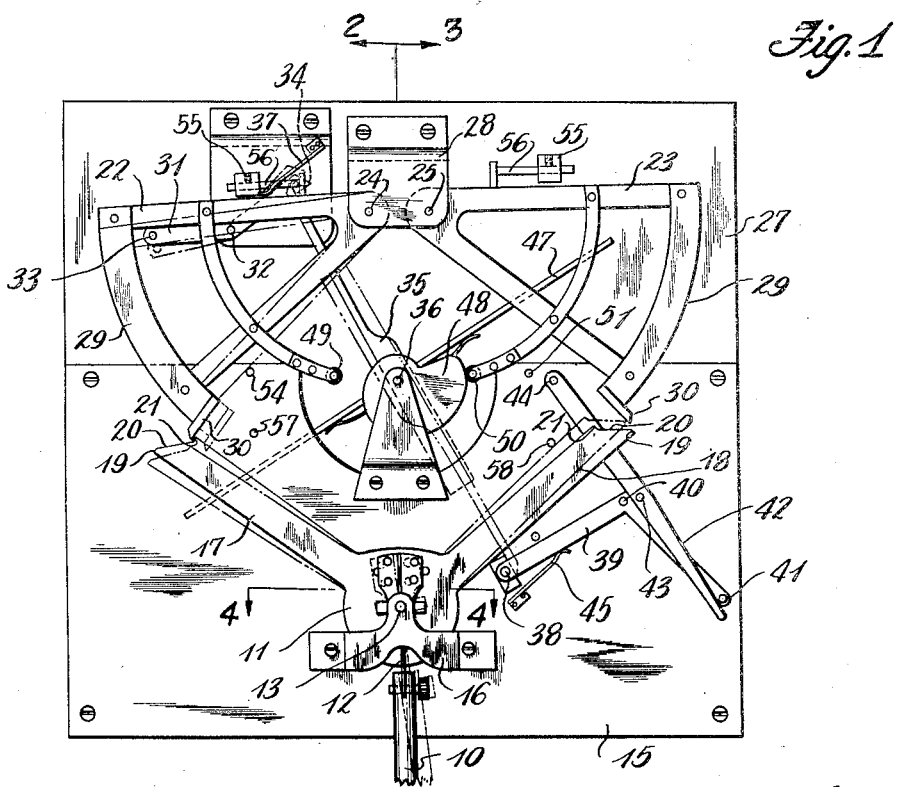
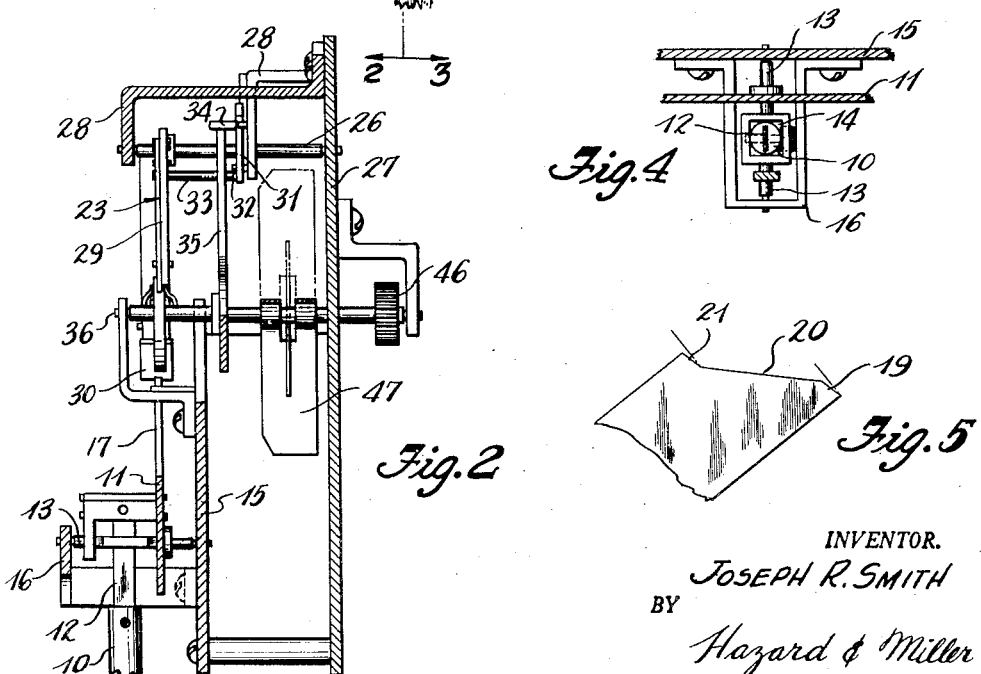
INVENTOR.
JOSEPH R. SMITH
BY
Hazard & Miller
Attorneys Feb. 14, 1950          J. R. SMITH          2,497,327

MECHANISM FOR IMPARTING IMPULSES TO PENDULUMS

Filed Dec. 19, 1945          2 Sheets-Sheet 2

INVENTOR.
JOSEPH R. SMITH
BY
Hazard & Miller
Attorneys

Patented Feb. 14, 1950

2,497,327

UNITED STATES PATENT OFFICE 2,497,327

MECHANISM FOR IMPARTING IMPULSES TO PENDULUMS

Joseph R. Smith, Los Angeles, Calif.

Application December 19, 1945, Serial No. 635,894

5 Claims. (Cl. 58—124)

This invention relates to an improved timing device such as a clock employing a pendulum.

An object of the invention is to provide an improved means for imparting impulses to a pendulum to maintain its swinging.

In highly accurate timing devices which employ pendulums it is desirable to impart to the pendulum an impulse during each swing of the pendulum with each impulse being of exactly the same power or magnitude and of the same duration and to have the impulse applied during the same period in the arc of swing of the pendulum preferably at or near the center or bottom of its swing and in the direction in which the pendulum is then swinging without in any way interfering with the normal swing of the pendulum under the influence of gravity with the sole exception of delivering the added impulse to maintain the swing. In the clock-making industry a pendulum which is supplied with impulses in this manner to maintain its swing is termed a free pendulum.

An object of the invention is to provide an improved mechanism for imparting impulses to a pendulum which will meet all of the above desiderata with great exactness so that a highly accurate clock or timing device is obtainable.

More specifically, an object of the invention is to use in a timing mechanism a pendulum and to employ gravity-operated means or otherwise operated means to furnish power for the impulses imparted to the pendulum and to provide means for causing the swinging pendulum to determine and control the exact point in each arc of swing at which the delivery of the impulse is started and to maintain this point in the same relative position in the arc of swing during each swing of the pendulum and to so locate the start of each impulse that the entire impulse during each swing will be delivered to the pendulum in the direction in which it is then swinging and will occur at or near the center of each arc of the swing and to provide means to accomplish all of the foregoing objectives without in any way interfering with the normal swing of the pendulum with the sole exception of the delivery of the impulses.

Another object of the invention is to use in a timing mechanism a pendulum and gravity or otherwise operated means to furnish power for the impulses imparted to the pendulum and to provide means for causing the swinging pendulum to determine and control the exact duration and the delivery of the impulse during each swing of the pendulum and to maintain the same duration of the delivery of the impulse during each swing of the pendulum without in any way interfering with the normal swing of the pendulum with the sole exception of the delivery of the impulses.

With the foregoing and other objects in view, which will be made manifest in the following detailed description and specifically pointed out in the appended claims, reference is had to the accompanying drawings for an illustrative embodiment of the invention, wherein:

Figure 1 is a front view in elevation, illustrating the mechanism embodying the present invention in that position wherein the pendulum is at the bottom of its swing from left to right in full lines and in that position wherein the pendulum has completed its swing to the right in dotted lines;

Fig. 2 is a vertical section taken substantially upon the line 2—2 upon Fig. 1 in the direction indicated;

Fig. 4 is a horizontal section taken substantially upon the line 4—4 upon Fig. 1 in the direction indicated;

Fig. 5 is a partial view on an enlarged scale of the end of one of the arms associated with the pendulum.

Figure 3:
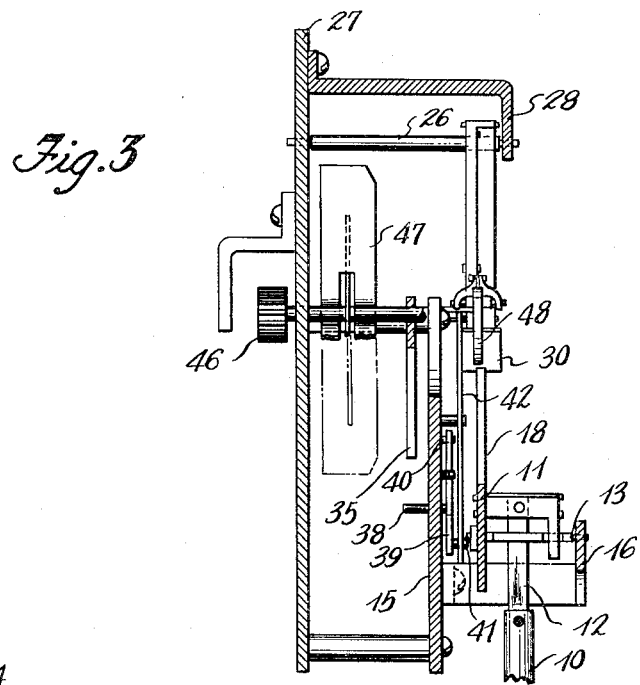
Fig. 3 is a vertical section taken substantially upon the line 3—3 upon Fig. 1 in the direction indicated.

Referring to the accompanying drawings wherein similar reference characters designate similar parts throughout, 10 indicates the shaft or rod of a pendulum which may have any suitable form of bob or weight on its lower end and which may be of any preferred or conventional construction that may be required to compensate for temperature variations.

The pendulum is suspended from a rocker 11 by means of a thin leaf spring 12. The rocker is pivotally mounted for oscillation about a horizontal axis by means of a shaft 13 having an opening 14 therethrough, see Fig. 4, through which the spring 12 extends with adequate clearance to permit of the slight flexing of the spring. As the plane of the spring extends through the horizontal axis of the shaft 13 the pendulum in effect may be regarded as swinging about the axis of the shaft although the upper end of the spring 12 is secured to the face of the rocker above the axis of the shaft. The shaft 13 has its ends pivotally supported between a plate 15 and a bridge 16 and the rocker 11 is rigidly mounted thereon. If desired, the ends of the shaft may be equipped with knife edges which turn on suitable palates or jeweled mountings for the shaft may be otherwise provided. The rocker 11 has two upwardly extending divergent arms 17 and 18 which are symmetrically arranged with respect to the plane through the axis of shaft 13 and through the longitudinal axis of the shaft or rod 10. These arms are of equal length and at their upper ends they are provided with impulse surfaces of equal lengths. Each of these impulse surfaces may be regarded as being composed of three sections, the outermost section 19 being short, the intermediate section 20 being longer, and the innermost section 21 being short, as illustrated in Fig. 5. The surface 20 on each arm may be regarded as its main impulse surface, and the surface 19 and 21 may be regarded as auxiliary impulse surfaces. The main impulse surface 20 is inclined at approximately forty-five degrees to the length of its arm or to a radius from the pivot 13 through the main impulse surface 20. The auxiliary impulse surfaces 19 and 21 are more abruptly inclined to the length of the arm or to the mentioned radius from the pivot 13 and are at approximately seventy-five degrees thereto.

Associated with each of the arms 17 and 18 are sector-shaped weights 22 and 23, respectively. These weights are pivotally mounted for rotation about horizontal axes 24 and 25, respectively, provided by shafts 26 that extend from a back plate 27 to a bridge 28. These weights when released are adapted to swing downwardly about the axes 24 and 25 toward the arms 17 and 18, respectively. Each weight is preferably formed of two radial arms connected by an outer arcuate member 29 having at its lower end an extension 30 engageable with the surfaces 19, 20, and 21, on their respective arms. Associated with the weight 22 is a lever 31 pivoted at 32 and carrying a pin 33 that is engageable by the upper radial arm of the weight 22. This lever carries an arresting pin 34 adapted to be moved into the path of a finger 35 on a horizontal shaft 36. The lever is normally urged into the position wherein the arresting pin 34 is in the path of the finger by means of a leaf spring 37. However, whenever the weight 22 is released so that it may swing downwardly the upper radial arm of the weight 22 is engageable with the pin 33 to tilt the lever 31 about its axis 32 against the action of the spring 37 and to move the arresting pin 34 out of the path of finger 35 and thus permit the shaft 36 on which the finger is mounted to rotate. In a similar manner, at a point diametrically opposite there is an arresting pin 38 that may also be positioned in the path of the finger 35. This arresting pin is mounted on a bellcrank 39 pivoted at 40 and carrying a pin 41 engageable by a lever 42 that is pivoted at 43. The lever 43 carries a pin 44 engageable by the lower radial arm of the weight 23 so that when the weight 23 is released to swing downwardly it will engage the pin 44 and actuate the lever 42 and bellcrank 39 against the action of the spring 45 to move the arresting pin 38 out of the path of the finger 35.

Power from any suitable source such as a spring, weights, or any equivalent means is applied to the shaft 36 through a pinion 46 urging this shaft to rotate in a clockwise direction. On the shaft 36 there is preferably provided a suitable fan 47 which will tend to dampen or retard its rotation whenever the finger 35 is released. There is also provided on this shaft a cam 48 engageable with rollers 49 and 50 that are carried by the two weights 22 and 23.

Figure 6:
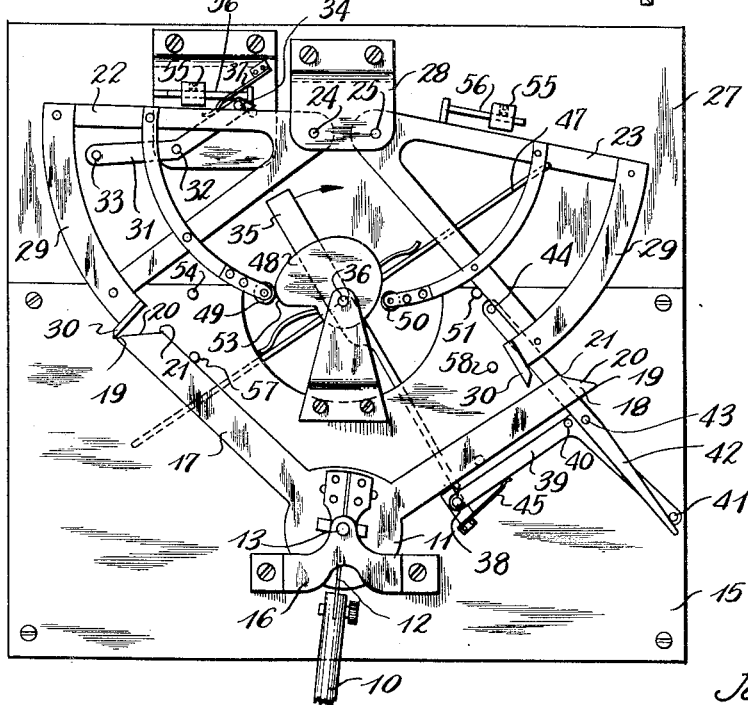
Fig. 6 is a view similar to Fig. 1, but illustrating the pendulum in that position wherein the pendulum has substantially completed its swing toward the left.

The operation of the above described construction is substantially as follows: In Figure 1, the pendulum may be assumed to be near the center or lowest point in its swing from left to right and the extension 30 on weight 22 is sliding off the slightly inclined auxiliary impulse surface 21 on arm 17 which action will hereinafter be explained. As extension 30 slides down off the auxiliary impulse surface 21 it causes the arm 17 to move slightly in a counterclockwise direction around its axis 13 to the position shown by the dotted lines and thus causing arm 18 to move up to the position shown by the dotted lines. Weight 22 then drops and its upper radial arm engages pin 33 to shift the arresting pin 34 and release the finger 35. Further downward movement of weight 22 is ultimately arrested by the stationary pin 54. Weight 22 is then in the position shown by the dotted lines in Fig. 1. When the finger 35 is released by the arresting pin 34 the power applied to the shaft 36 through the pinion 46 is then effective to rotate the shaft and the finger thereon in a clockwise direction through one-half of a revolution or until the finger engages the arresting pin 38. During this half of a revolution the cam 48 engages the roller 49 on weight 22 and lifts the weight 22 from the position shown by the dotted line position in Fig. 1 to the position shown in Fig. 6. This same half of a revolution of the cam permits the weight 23 to move down and deposit the extension 30 onto the auxiliary impulse surface 19 of arm 18. It will be noted that the highest point on the cam is somewhat in advance of a lower portion indicated at 53 in Figure 6, so that as the cam starts its one-half revolution the weight is gradually lowered thus permitting extension 30 to gently come to rest on surface 19. Another advantage in having the cam thus shaped is that the cam may be so placed on shaft 36 that when finger 35 is held by the arresting pin 34 the highest point on the cam has already passed under roller 50 and the cam is then holding the extension 30 slightly above the auxiliary impulse surface 19 and when the cam starts its one-half revolution it is not required to start its motion while still continuing to lift the weight 23 but starts its motion while lowering the weight. Thus, the effect of the weight resting on the cam does not have a retarding effect on the cam at the time it is starting its motion, but actually aids it. When extension 30 is on the auxiliary impulse surface 19 there is a slight but definite tendency to slide off, because of the slight inclination of this surface. However, the time that has elapsed between the period in the operation of the mechanism when arm 18 comes to rest against pin 58 and the period when weight 22 has fallen against pin 33, releasing finger 35 allowing cam 48 to deposit extension 30 on the auxiliary impulse surface 19, has permitted the pendulum to traverse a small section in its arc of swing toward the right and thus caused a slight bend in the spring 12 the tension thus produced in the spring holding arm 18 against pin 58 and preventing extension 30 from sliding off the slightly inclined auxiliary impulse surface. These parts thus remain stationary while the pendulum finishes its swing to the right and starts its return swing to the left. As the pendulum swings to the left the spring gradually assumes its normal straight position and thus the tension in the spring is gradually reduced until at a certain point it becomes weak enough to permit the extension 30 through the effect of weight 23 to slide off the auxiliary impulse surface 19 onto the main impulse surface 20. As the extension 30 slides down the impulse surface 20 the weight 23 is effective to urge the rocker 11 in a clockwise direction which tends to advance the rotation of the rocker 11 in advance of its movement generated by the pendulum. The advancing of the rocker with relation to the pendulum causes an impulse to be transmitted to the pendulum urging it from right to left. This impulse is commensurate with the weight 23 and is applied through a certain portion of the swing of the pendulum measured by the extension 30 traversing the full length of the main impulse surface 20 between the auxiliary impulse surface 19 and the auxiliary impulse surface 21. When the extension 30 reaches the auxiliary impulse surface 21 on arm 18 there is a slight but definite tendency to slide down this auxiliary impulse surface due to its slight inclination as shown in Fig. 5, but it is prevented from doing so by the impulse tension still remaining in the spring, due to the fact that while the impulse is being applied, the rocker 11 is slightly advanced with relation to the pendulum, slightly flexing the spring. As the pendulum continues its swing to the left the spring gradually unflexes, thus gradually lessening the tension in the spring until the tension finally becomes weak enough to permit the extension 30 actuated by the weight 23 to slide down the surface 21. As extension 30 slides off the surface 21 on arm 18 this arm is moved down causing arm 17 to move up and weight 23 then drops and its lower radial arm engages pin 44 and causes pin 38 to release the finger 35. Further downward movement of the weight 23 is ultimately arrested by a stationary pin 51. This position of weight 23 is shown in Fig. 6. The power applied to the shaft 36 through the pinion 46 once is again effective to rotate the shaft and the finger thereon in a clockwise direction through one-half of a revolution or until the finger again engages the arresting pin 34. During this one-half of a revolution the cam 48 engages the roller 50 on the weight 23 and lifts the weight 23 from the position shown in Fig. 6 to the position shown in Fig. 1. This same half revolution of the cam releases roller 49 on weight 22 and allows the extension 30 on weight 22 to move down and gently deposits it on the surface 19 on arm 17. When extension 30 rests on surface 19 on arm 17 there is a slight but definite tendency to slide off because of the slight inclination of the surface. However, the time that has elapsed between the period in the operation of the mechanism when arm 17 comes to rest against pin 57 and the period when weight 23 has fallen against pin 44 releasing finger 35 and permitting cam 48 to deposit extension 30, on the surface 19 of the arm 17, the pendulum has traversed a small section in its arc of swing toward the left and has thus caused a slight bend in the spring, the tension thus produced in the spring holding arm 17 against pin 57 and thus preventing the extension 30 from sliding off the slightly inclined surface 19. These parts remain stationary in this position while the pendulum finishes its swing to the left and then starts its return swing to the right. As the pendulum swings toward the right the spring gradually unflexes and thus the tension in the spring is gradually lessened until this tension finally becomes weak enough to permit the extension 30 due to the effect of the weight 22 to slide down the auxiliary impulse surface 19, and onto the main impulse surface 20 on arm 17. As the extension 30 on weight 22 slides down the main impulse surface 20, the weight 22 is effective to urge the rocker 11 in a counterclockwise direction which tends to advance the rotation of the rocker in advance of its movement generated by the swinging pendulum. The advancing of the rocker with relation to the pendulum causes an impulse to be transmitted to the pendulum urging it from left to right. This impulse is commensurate with the weight 22 and is applied through a certain portion of the swing of the pendulum measured by the extension 30 on weight 22 traversing the main impulse surface 20. When the extension 30 reaches the surface 21 on arm 17, there is a slight but definite tendency to slide down this surface due to its slight inclination as shown in Fig. 5, but it is prevented from doing so by the impulse tension still remaining in the spring, due to the fact that the rocker 11 is slightly advanced with relation to the pendulum, slightly flexing the spring. As the pendulum continues its swing to the right the spring gradually unflexes thus gradually lessening the tension in the spring until this tension finally becomes weak enough to permit the extension 30 actuated by the weight 22 to slide down the surface 21, thus completing one cycle of operation of the mechanism.

The inclinations of the auxiliary impulse surfaces 19 and 21 are such that the extension 30 would tend to naturally slide off of these surfaces under the influence of their respective weights whenever free to do so and consequently there is no effort required on the part of the pendulum to turn the rocker 11 when allowing the extension 30 to slide off of these surfaces. While the main impulse is produced by the extension 30 sliding along the main impulse surface 20 there will be also a slight impulse produced by the extension 30 sliding along the two auxiliary surfaces 19 and 21 so that the total impulse delivered to the pendulum through the rocker during each swing would be the sum of the effects produced by the extension 30 sliding along all three sections 19, 20 and 21 of the total impulse surface on each arm. The slight impulses produced by the extension 30 sliding along any one of the four auxiliary impulse surfaces 19 and 21 always starts at the same point in the arc of swing of the pendulum and continues for the same duration since they are produced each time by the same weight sliding the same distance along the same surface. Therefore the power, the starting point and the duration of the total impulse delivered to the pendulum during each swing remains constant.

The effect of the weights 22 and 23 in imparting impulses to the pendulum may be adjusted by means of adjustable weights 55 that are adjustable along the lengths of the arms 56 toward and away from their centers of rotation 24 and 25, respectively.

It will be observed from the above-described mechanism that the impulses applied to the pendulum 10 are equal in magnitude by virtue of the fact that the weights 22 and 23 are of equal mass. Furthermore, as the impulse delivered is only by means of the weight any variations in power applied to the pinion 46 will have no effect whatsoever on the impulse transmitted to the pendulum 10 from the weights. The power is employed solely for the purpose of restoring the weights to their initial positions and to drive any timed mechanism such as for example clock hands, that may be driven off of the pinion 46. The impulse that is transmitted to the pendulum 10 by the weights during each swing of the pendulum is of equal duration which is governed by the definite lengths of the impulse surfaces which in turn are of equal length. Furthermore, the impulse is delivered intermediate the ends of the swing of the pendulum and at or near the bottom of its swing which is highly desirable. The impulse being actually transmitted from the rocker 11 to the pendulum 10 through the spring 12 which extends through the axis of shaft 13 around which the pendulum swings is gentle and in the same direction as that in which the pendulum is swinging and in such a manner as not to interfere with or modify the normal free swing of the pendulum other than to give to it an added impulse that will maintain its swing.

It will thus be appreciated that the improved mechanism possessing the above advantages enables a highly accurate timepiece or timing mechanism to be provided. The primary purpose of the adjustable weights 55 is to correct for any inequalities in the weights 22 and 23 and to enable these weights to readily be balanced in their effectiveness on the total impulse surface made up of the sections 19, 20 and 21 on the arms 17 and 18.

Various changes may be made in the details of construction without departing from the spirit and scope of the invention as defined by the appended claims.

I claim:

1. In a timing device, a pendulum, a spring suspending the pendulum from its axis of swing, a rocker having a pair of oppositely extending arms above the spring rigidly connected to each other and to the spring so as to be resiliently connected to the pendulum to move sympathetically therewith, each arm presenting a main impulse surface inclined to the radius therethrough from the axis of swing of the pendulum, the main impulse surfaces being of equal length, there being auxiliary surfaces at the ends of each main impulse surface which are more inclined to the mentioned radius than their respective main impulse surfaces, and means for applying equal impulses to the pendulum through said surfaces, each impulse applying means being adapted to engage the outermost auxiliary surface on its respective arm, then the main impulse surface thereon, and finally the innermost auxiliary surface whereby the impulses applied to each main impulse surface will be of equal magnitude, equal duration, and applied during the same portion of the swing of the pendulum and in a direction urging the pendulum through its spring suspension in the direction of its swing, and means for alternately releasing the impulse applying means for applying impulses to their respective arms.

2. In a timing device, a pendulum, a spring suspending the pendulum from its axis of swing, a rocker having a pair of oppositely extending arms above the spring rigidly connected to each other and to the spring so as to be resiliently connected to the pendulum to move sympathetically therewith, each arm presenting a main impulse surface inclined to the radius therethrough from the axis of swing of the pendulum, the main impulse surfaces being of equal length, there being auxiliary surfaces at the ends of each main impulse surface which are more inclined to the mentioned radius than their respective main impulse surfaces, means for applying equal impulses to the pendulum through said surfaces, each impulse applying means being adapted to engage the outermost auxiliary surface on its respective arm, then the main impulse surface thereon, and finally the innermost auxiliary surface whereby the impulses applied to the auxiliary impulse surfaces will be of equal magnitude and the impulses applied to the main impulse surfaces of each arm will be of equal magnitude, equal duration and applied during the same portion of the swing of the pendulum and in a direction urging the pendulum through its spring suspension in the direction of its swing, and means for alternately releasing the impulse applying means for applying impulses to their respective arms.

3. In a timing device, a pendulum, a spring suspending the pendulum from its axis of swing, a rocker having a pair of oppositely extending arms above the spring rigidly connected to each other and to the spring so as to be resiliently connected to the pendulum to move sympathetically therewith, each arm presenting a main impulse surface inclined to the radius therethrough from the axis of swing of the pendulum, the main impulse surfaces being of equal length, there being auxiliary surfaces at the ends of each main impulse surface which are more inclined to the mentioned radius than their respective main impulse surfaces, weights pivoted above the axis of swing of the pendulum and carrying extensions adapted to engage consecutively the outermost auxiliary impulse surface, the main impulse surface and the innermost auxiliary impulse surface on their respective arms whereby the impulses applied to the pendulum through the impulse surfaces of each arm will be of equal magnitude, equal duration, and applied during the same portion of the swing of the pendulum and in a direction urging the pendulum through its spring suspension in the direction of its swing, means for alternately releasing the weights to apply impulses to their respective arms, and power-actuated means for restoring the weights alternately after they have applied impulses to their respective arms.

4. In a timing device, a pendulum, a spring suspending the pendulum from its axis of swing, outwardly directed arms rigid with the spring and yieldably connected by the spring to the pendulum, each arm presenting main impulse surfaces of equal length and inclination to radii therethrough from the axis of swing of the pendulum, each arm having auxiliary impulse surfaces at the ends of their respective main impulse surfaces which are of equal inclination to their respective radii and are of equal length, and means for alternately applying auxiliary impulses of equal magnitude to the outermost auxiliary impulse surfaces, thereafter main impulses of equal magnitude to each other to the main impulse surface and finally auxiliary impulses to the innermost auxiliary impulse surfaces whereby the main impulses imparted to the pendulum will be delivered through the main impulse surfaces of equal magnitude, equal duration and during the same portion of the swing of the pendulum urging the pendulum in the direction of its swing.

5. In a timing device, a pendulum, a spring suspending the pendulum from its axis of swing, a rocker rigid with the spring and resiliently connected thereby to the pendulum, said rocker presenting two oppositely inclined main impulse surfaces of equal inclination and equal length, auxiliary impulse surfaces at the ends of the main impulse surfaces, the auxiliary impulse surfaces having equal inclinations to the main impulse surfaces and being of equal length, impulse imparting means adapted to be applied to the outermost auxiliary impulse surfaces and to traverse the outermost auxiliary impulse surfaces, then the main impulse surfaces, and finally the innermost impulse, the impulse imparting means being adapted to impart impulses of equal magnitude to the impulse surfaces, and means for alternately applying the impulse imparting means to the outermost auxiliary impulse surfaces.

JOSEPH R. SMITH.

REFERENCES CITED

The following references are of record in the file of this patent:

UNITED STATES PATENTS

| Number | Name | Date |
| --- | --- | --- |
| 280,463 | Gerry | July 3, 1883 |
| 508,760 | Riefler | Nov. 14, 1893 |

FOREIGN PATENTS

| Number | Country | Date |
| --- | --- | --- |
| 26,780 | Great Britain | Dec. 4, 1907 |
| 331,946 | Great Britain | July 17, 1930 |